United States Patent Office 3,441,965
Patented May 6, 1969

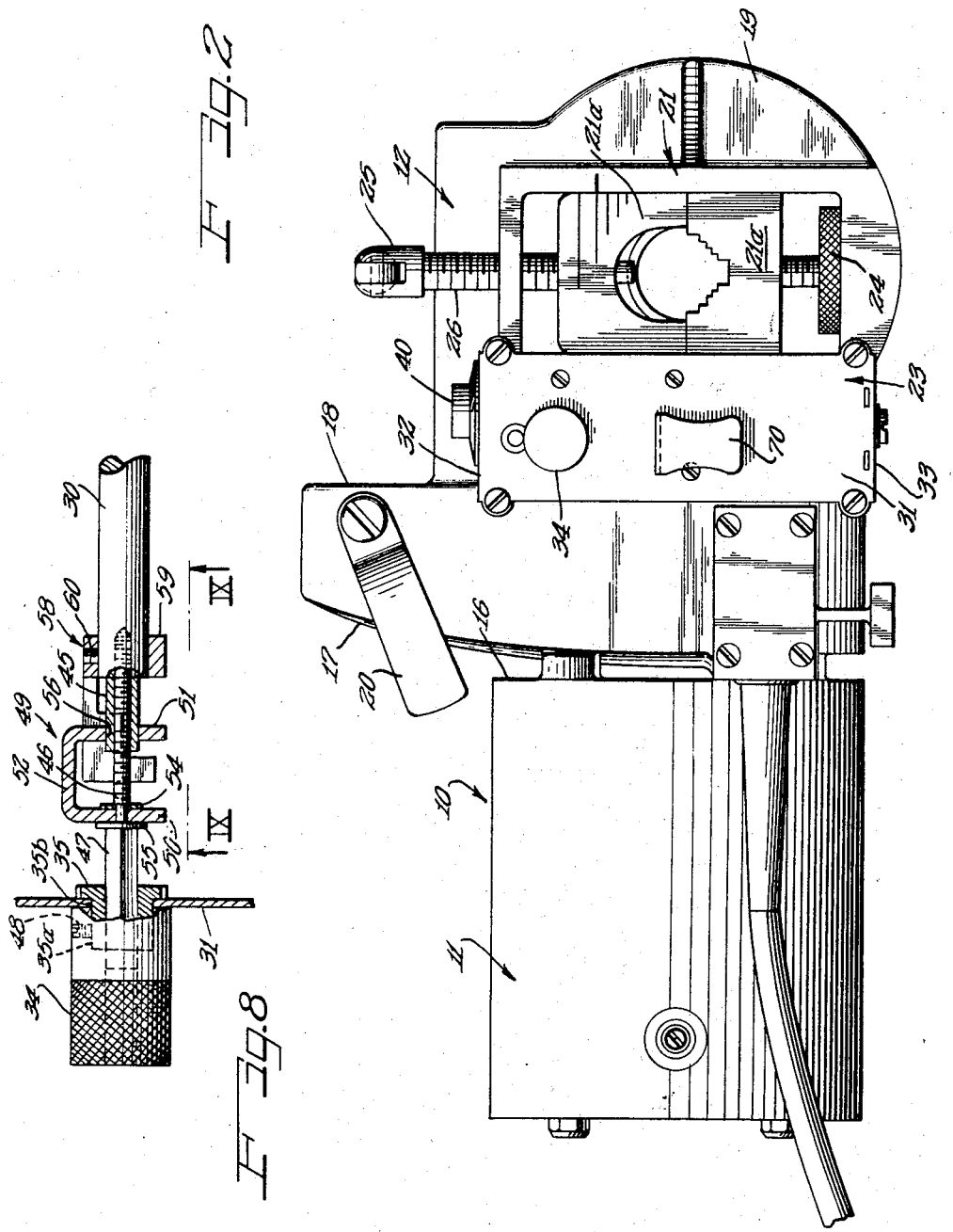

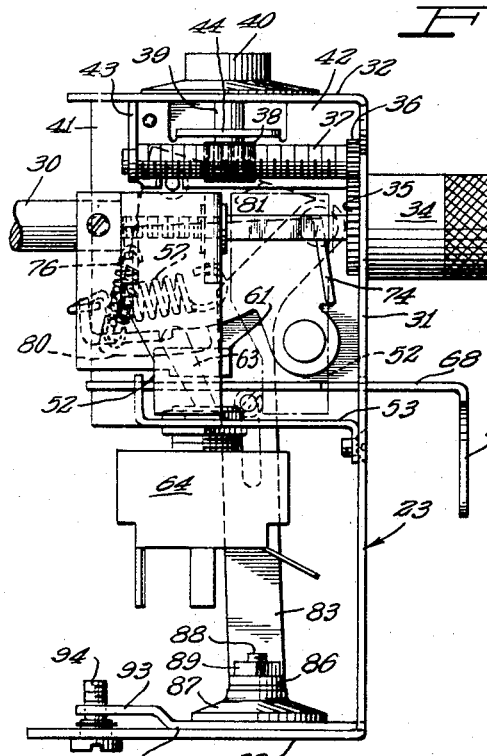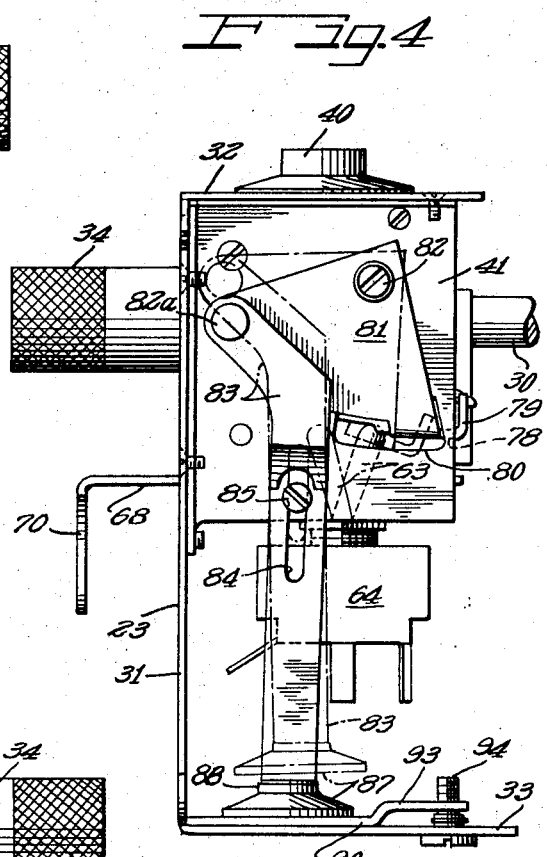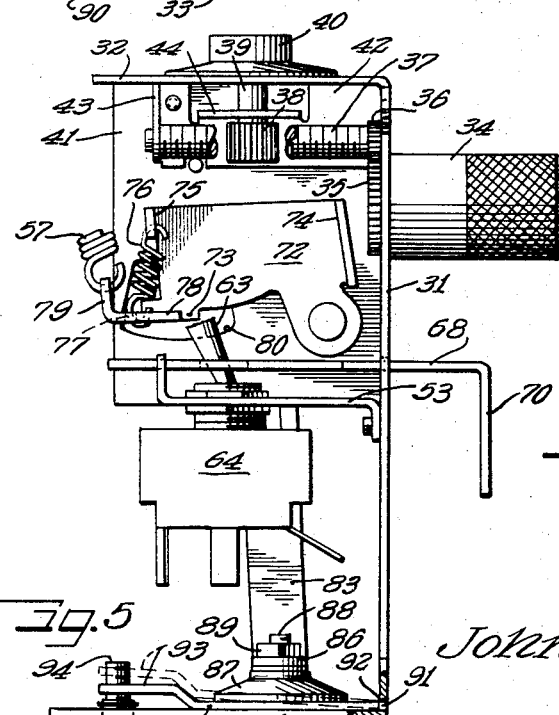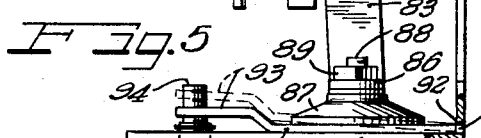

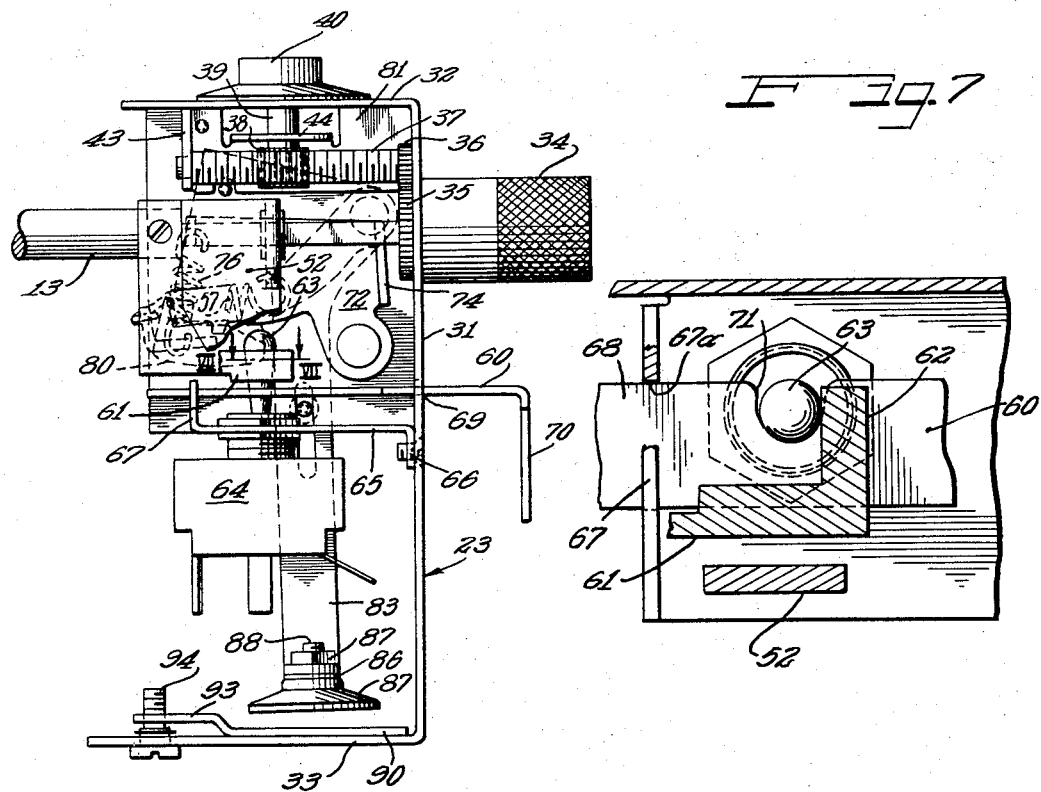

3,441,965
AUTOMATIC REVERSIBLE ELECTRIC MOTOR TOOL
John N. Cutrone, 6717 Navajo, Lincolnwood, Ill. 60645
Filed Dec. 22, 1966, Ser. No. 603,838
Int. Cl. B23g 1/00, 3/04
U.S. Cl. 10—89                    20 Claims

ABSTRACT OF THE DISCLOSURE

An automatic reversible electric tool for performing work, such as cutting threads on a work piece, and wherein a motor reversing switch is so operatively interrelated with the performance of the work that it is not only automatically shiftable from a forward drive position through an off position to a reversible position and back to the off position upon the performance of the work, but is also temporarily held in the off position before going into the motor reversing position so as to allow time for the motor to stop turning before being reversed. Graduated means is also present for varying switch tripping mechanism to provide for different lengths of thread on the work.

CROSS-REFERENCE TO RELATED APPLICATIONS

The subject hereof is an improvement on that disclosed in my co-pending patent application, Ser. No. 387,929, filed Aug. 6, 1964, now Patent 3,316,571.

SUMMARY OF INVENTION

This invention relates to a reversible electric motor driven work performing tool, such as a pipe threader, which automatically reverses and stops after completing work or a threading cycle, and which also automatically temporarily stops the motor in going from a forward to a reversing position so as to allow time for the arresting of the rotation of the motor before being reversed.

The invention will hereinafter be specifically described in the embodiment of a pipe threader, but it should be appreciated that the pipe threading die driven by the tool of this invention can be replaced with other types of work performing tools such, for example, as cutting or broaching tools, and that, therefore, the invention is not limited to a pipe threader.

An object of this invention is to provide a reversible electric motor tool with improved automatically operable switching mechanism responsive to the performance of work by the tool.

A further object is to provide, in a switching mechanism for a reversible electric motor tool, a mechanical time delay device which does not depend upon the use of complicated electric circuitry for its functioning.

Another object of the invention is to provide an improved reversible electric motor tool with electric switch mechanism triggered so as to dwell automatically between forward and reversing positions to permit of a time delay before the motor is automatically reversed whereby turning of the motor is arrested before being switched into reversing position.

Still another object of the invention is to provide graduated means for varying the travel of triggered tool switch mechanism to provide for different lengths of thread on the work piece.

In accordance with the general features of this invention, there is provided in an automatic reversible electrical motor tool including a work piece receiving casing the improvement comprising switch means for actuating the motor for both forward and reverse turning and with an intermediate off position, work performing mechanism actuated by the motor to perform predetermined operations on the work piece and including movable means carried by the casing responsive to the direction of movement of the mechanism for actuating the switch means to both forward, reverse and off positions, and a tripping device interrelated with the switch means for holding same temporarily in an intermediate off position between forward and reverse positions and for a period of time sufficient for the motor to stop turning while the work performing mechanism is in engagement with the work piece before the direction of turn of the motor is reversed by the switch means.

Other features of the invention relate to the provision of a switch tripping device including time delay mechanism which is mechanical in character, and, in the embodiment illustrated, includes a suction cup movable into a gripping position, but automatically releasable after an interval of time by the build-up of spring pressure thereon.

Still another feature of the invention resides in the tool switch tripping mechanism being provided with adjustable mechanism having visual indicia graduated in terms of length of thread cut for varying the extent of travel of the tripping mechanism in accordance with the length of thread desired.

Other objects and features will more fully appear from the following detailed description taken in connection with the accompanying drawings which illustrate a single embodiment of the invention.

BRIEF DESCRIPTION OF DRAWINGS

FIG. 2 is a side view of the tool shown in FIG. 1;

FIG. 3 is a side view of the switch box and mechanism slid out from the tool body showing switch in forward drive position;

FIG. 4 is a side view of the mechanism shown in FIG. 3, but looking at it from the other side and showing, in dotted lines, the reversing position of switch and suction cup;

FIG. 5 is view similar to FIG. 3, with parts removed to show more clearly the internal mechanism and with switch handle partly broken away to show holding lug, the lower portion of the frame being broken away and the dotted lines showing how the position of the suction cup gripping plate can be varied;

FIG. 6 is a view similar to FIG. 3, but partly broken away to show switch in a neutral or off position;

FIG. 7 is an enlarged fragmentary sectional view taken on the line VII—VII of FIG. 6 looking downwardly;

FIG. 8 is a fragmentary sectional view showing more in detail the mechanism for adjusting the longitudinal position of the control rod so as to determine the length of the thread being cut;

FIG. 9 is a fragmentary view generally taken on the line IX—IX of FIG. 8 looking in the direction indicated by the arrows;

FIG. 10 is a diagrammatic view of a typical three-position switch motor circuit such as employed with the present motor tool; and FIG. 11 is a detailed view of the pivoted tripping lever showing more clearly its depending lug holding the switch actuator from moving the electrical switch arm.

DETAILED DESCRIPTION

Figure 1:
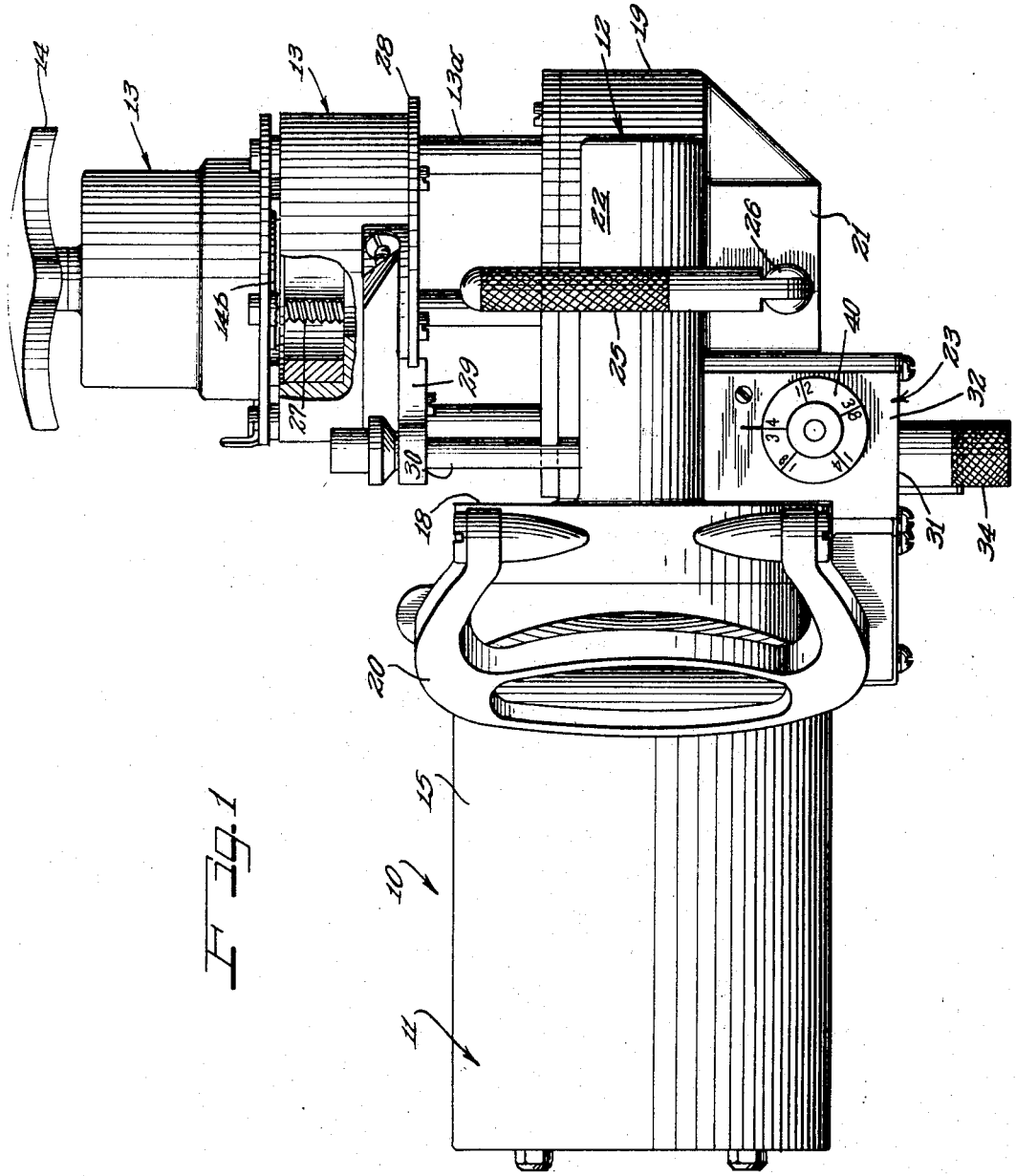
FIG. 1 is a plan view of an automatic reversible electric motor tool with switching mechanism embracing this invention, and partly broken away to show the pipe threading die components.

At the outset, it should be noted that, since the present invention is primarily concerned with the improvement of the automatically triggered switch mechanism of my aforesaid pending patent application, there shall only be described herein such portions of the portable tool as are necessary to bring out the environment and interrelationship of the switch mechanism to the operating components of the motor driven tool. Other details of structure of the tool disclosed in my co-pending application, but not believed necessary for an understanding of this invention, will, therefore, not be illustrated or described herein.

The portable tool comprising here a pipe threader and vise 10, shown in FIGS. 1 and 2, includes a reversible electric motor and casing 11, a gear casing 12, and a loading or threading pressure device 13 having a rotatable handle 14 projecting therefrom. The motor casing 11 includes a cylindrical cup 15 with an open front end 16 (FIG. 2) spaced behind the gear casing 12. The gear casing 12 includes a cover 17 extending across the open end 16 of the motor casing in spaced forward relation therefrom and closing a head 18 with a front wall from which projects a rib-like casing body 19 with opposite flat sides and a generally cylindrical dome. A manually engageable handle 20 is pivotally mounted on the top portion of the casing head 18 for carrying and manually supporting and manipulating the tool.

The body 19 has an integral vise housing 21 projecting laterally from the rightside face thereof as viewed from FIGS. 1 and 2 while the opposite side of the body 19 has an annular rim portion 22 (FIG. 1) surrounding a large diameter opening. A switch housing or box 23 is positioned between the vise housing 21 and the head 18 in integral relation with the body 19 and is adapted to have slid therein switch mechanism of this invention.

Before getting into the description of the switch mechanism of my invention, it would be well to note that in the use of the tool a work piece is inserted endwise into the vise parts or jaws 21a of the vise housing 21 (FIG. 2) until it is brought into engagement with a conventional threading die 27 (FIG. 1) inside of the reciprocal carriage 13. Then, by turning the nut 24, the two vise parts may be engaged with the work piece (not shown), and by turning the handle 25 the stud 26 may be brought into cooperation with the work in securing the work or pipe in fixed position.

The adjustment of the vise parts or jaws, as disclosed in my co-pending application, enables the accommodation of different sizes of pipe.

By turning handle 14a, spring urged piston may be pressed endwise against the die for pressing it against the end of the pipe in initiating the threading operation.

The carriage 13 is slidably mounted on rods 13a extending into the body 19 for cooperation with gearing (not shown) in the casing 12 which rotates not only the rods 13a but the carriage 13.

As the die 27 is threaded on the end of the work piece or pipe, through the rotation of the carriage 13 in which the threading die is disposed, the carriage moves toward the body 19. This occurs during the forward drive position of switch mechanism in switch box 23, to be hereinafter described. Similarly, when the switch mechanism is tripped to reverse position after the desired length of thread has been cut, the rotating drive carriage 13 slides backward away from the body 19 so as to unscrew the die 27 from the work piece.

The carriage 13 has a peripheral flange (FIG. 1) 28 facing the body 19 and which is engaged by a grooved arcuate shoe 29 secured to a reciprocal switch control rod 30 extending into the switch box 23. This rod 30 effects tripping of the switch mechanism from a forward position through a neutral or off position and to a reverse position as shall become more apparent hereinafter. It is with this particular control and switching mechanism that my present invention is particularly concerned. The switch actuating rod 30 can, of course, move back and forth without rotating with carriage 13 as the carriage flange 28 can rotate inside of the grooved shoe 29 carried by the rod and yet the rod moves back and forth with the die carriage.

The switch box 23 into which a switch operating reciprocal rod 30 projects includes a main generally U-shaped frame (FIGS. 3, 4, 5 and 6), the base 31 of which comprises a front cover for the box and parallel legs 32 and 33 which comprises top and end closures for the box (see FIGS. 1 and 2). The tool body 19 is suitably formed so that this frame can be slid therein and the rod connected to the shoe 29 for engaging the flange 28 of carriage 13 to move therewith.

The outer end of the rod 30 inside of the switch box is screw connected to an external knurled, bored or hollow knob 34 for turning rod as shown in FIG. 8, and as will be described more in detail hereinafter. It suffices at this point to note that the screw connection is merely an extension of the rod for lengthening or shortening it by turning the knob 34. The rod 30 (FIG. 3) carries a gear 35 (FIGS. 3, 5 and 8) which meshes with smaller gear 36 suitably journalled in the frame portion 31 and including a threaded screw or worm gear 37 to rotate therewith. This screw or worm gear 37 in turn meshes with a small gear 38 in a horizontal plane integral with a small rotating shaft 39 connected to a graduated knob 40 on the outer side of the top frame leg 32. The knob 40, as shown in FIG. 1, has a plurality of graduations or indicia thereon indicative of the extent of work or threads to be formed. For illustration, it could contain indicia such as 1/8", 1/4", 3/8", 1/2" and 3/4". This indicia represents the length of thread to be cut on the end of the work piece or pipe.

Extending vertically of and inside the U-shaped switch frame and suitably secured to the vertical frame portion 31 and the top leg 32 is a partition wall 41 disposed behind the gearing previously described and as shown in FIGS. 3 and 5. The upper end of this wall has fastened to it a generally L-shaped bracket 42 having its main leg flush with the wall 41 and a shorter leg 43 at right angles therein and in which the free end of the worm gear 37 is journalled. This bracket also has cut out from it and extending at right angles thereto a horizontal leg 44 in which the short shaft 39 carrying gear 38 is journalled (FIG. 5).

Now, referring once again to FIG. 8 and also FIG. 9, it will be perceived that the rod 30 inside of the switch box has a squared and internally threaded end 45 into which an adjusting screw 46 is threaded and which is formed integral with another squared portion 47 slidably disposed in a square slot in the gear 35 and its integral hub 35a projecting through an aperture 35b in frame wall 31. The gear hub 35a is locked to the knob by a set screw 48 so that the shaft 47 is freely slidable therethrough into the hollow knob 34.

The two squared shaft or rod portions 45 and 47 are interconnected by a U-shaped arm designated generally by the reference character 49 including two legs 50 and 51 and a connecting base part 52 which is elongated downwardly and cut on an angle, as shown in FIGS. 3 and 9, directly above a horizontal partition 53 (FIG. 3) suitably secured to the vertical portion 31 of the switch frame. The lower end of this elongated part 52 is adapted to move across the top surface of the partition 53 (FIG. 3).

One leg of the arm 49 (FIG. 8) is secured around a reduced portion of squared portion 47 and against the squared portion 47 by lock washers 54 and 55 so that as the knob 34 is turned this leg will move with the squared portion 47 and the screw 46. The other leg 51 has a squared aperture 56 slidably receiving the squared part 45 of shaft 30 so as to be adjustably movable thereover in a longitudinal direction.

Now, it will be appreciated that by turning the knob 34 it is possible to elongate or shorten the overall length of rod 30 considering, of course, both squared portions 45 and 47 as being part of the rod. In other words, it is possible to move the squared portion 45 from rod 30 toward or from squared portion 47 thereby shortening or extending the extent of travel of the carriage and necessarily the extent of threading before tripping the motor switch mechanism. The reason for this is that the leg 50 of the arm 49, in the movement of the carriage rod 30, will strike a switch latching lever to be hereinafter described. It should also be noted that the leg 50 (FIG. 9) has connected to it one end of a tension spring 57, the function of which will be later described herein.

Also secured to the end of the rod 30 at the squared portion 45 (FIGS. 3, 8 and 9) is a tripping arm 58. This tripping arm includes a squared portion 59 attached by any suitable means, such as a set screw 60 (FIG. 8), to the rod and a downwardly depending L-shaped portion 61, the free end of which is offset into a tripping lug 62 (FIG. 9). This lug is so located as to engage or contact automatically, as it moves backward, the motor switch arm 63 (FIG. 4), upon completion of the reversing operation, to move the electric switch arm 63 from the dotted lefthand position, shown in FIG. 4, to an intermediate vertical off position, shown in FIG. 6. In this respect, it will be noted that in FIG. 6 the downwardly extending portion or plate 52 has been cut away so as to show the lug 62 (which is also shown in FIG. 7) on lateral arm extension 61 in contact with and having moved the switch arm 63 of a conventional three-way electrical switch 64 into its intermediate neutral or off position.

The electric switch 64 is suitably carried by an angled plate or bracket 65 fastened at 66 to the upright portion 31 of the main U-shaped switch frame (FIGS. 6 and 7). The free end of this plate 65 is turned or angled upwardly at 67 and is transversely slotted at 67a to receive the reduced end of a horizontal switch starting arm 68. The arm extends through a slot at 69 in frame wall portion 31 and has a downwardly turned outer extremity 70 on the exterior of the switch box 23 (FIGS. 2 and 6) for manual engagement. It will be noted that an intermediate portion of the arm 68 (FIG. 7) is notched out at 71 to receive snugly therein the electrical switch operating arm 63. While the arm 68 moves with the upright switch arm 63 through the various positions, it is only engageable manually for moving the electrical switch 63 from the vertical upright off position, shown in FIG. 6, to the left or on position, shown in FIGS. 2 and 5.

So far, there has only been described the switch mechanism for manually moving the electrical switch arm 63 to the on position and for automatically moving it from the reversing position to the off position. I shall now describe the mechanism that relates to the moving of the switch arm 63 to the right, as shown in FIG. 3, from an on position temporarily to an intermediate off position after the threading operation has been completed and the motor has been arrested before being reversed.

As best shown in FIG. 5, there is pivotally mounted on and close to the partition wall 41 above the manual operating arm 68 a latching lever 72. This lever 72 is detailed out in FIG. 11. It comprises a plate which is contoured at its bottom and provided with a downwardly extending latching lug 73 as well as a flange 74 along one edge adapted to bottom against the gear 33 when tripped. The other upright edge of the lever has a smaller flange 75 to which is fastened one end of a tension spring 76, the other end of which is secured at 77 to an angled switch tripping lever 78. The vertical leg 79 of this tripping lever 78 has attached to it the other end of previously described tension spring 57. Spring 76 serves to pull the free end of lever 72 downwardly to engage its latching lug 73 against the forward edge of tripping lever 78 to hold it against movement.

As noted before, the flange 74 of lever 72 is so located as to be in the path of travel of leg 50 of the U-shaped member 49 (FIG. 2) as the squared portion 47 of rod 30 is moved out of the knob 34 by the movement of the die carriage 13 connected to the rod in the threading operation. When this occurs, the spring 57 is progressively tensioned causing the lever 78 to likewise be forced toward the electrical switch lever 63. The tension of spring 57 builds up until lever lug 72 is moved upwardly when such pressure becomes effective to cause lever 78 to snap the electric switch arm 63 to an intermediate upright off position shown in FIG. 6.

While moving the switch arm 63 to such off position will turn off the motor, it is desirable to have a dwell or time delay before the switch arm 63 is moved to the motor reversing position so as to permit the motor to stop turning. I shall now describe the mechanism which effects this and which is a part of the operation of the tripping lever 78.

The lever 78 comprises an angled extension projecting through an arcuate or curved slot 80 in the vertical partition wall 41 and is integral with a pivoted plate 81 on the other side of the partition 41 shown in FIG. 4. The pivot for the plate is at 82. The plate is generally of a triangular-like construction and has pivoted to another corner at 82a a downwardly extending somewhat angled vertical leg 83 with a vertical slot 84 (FIG. 3) having a lost motion sliding connection with the partition wall 41 by means of a bolt 85 extending through the slot. The lower end of this leg 83, below partition wall 41, is likewise angled at 86 (FIG. 3) which angled extremity carries a resilient rubber suction cup 87. The suction cup has the usual threaded stud 88 secured to the angled extremity 86 of leg 83 by a nut 89.

The suction cup 87 is cooperable with a slightly angled horizontal adjustable plate 90, one edge of which has two identical spaced tangs 91 projecting into slots 92 in the frame wall 31 (FIG. 5). The other edge of the plate is angled at 93 away from the leg 33 and has adjustable bolt 94 projecting through frame leg 33 for slightly raising or lowering the plate 90. In this adjustment, the tangs can move or pivot in the slots 92 in frame wall 31. This enables the plate to be brought closer to or further away from the suction cup for varying the gripping coaction of the cup with the plate as desired. It should be noted the suction cup 87 is in gripping position when the switch is in on and off positions, but not in the reversing position of the switch.

As noted before, the three-way switch block 64 is of a conventional structure and the circuit between it and the motor is diagrammatically illustrated in FIG. 10. There, the switch arm 63a is shown in a neutral position connected to incoming power leads 95—95. Two pairs of contacts 96—96 and 97—97 are connected in the usual way to the reversible motor diagrammatically illustrated at 11a.

When the switch arm 63a is moved from the neutral position into engagement with one pair of contacts, such as 96—96, the reversible motor can be connected, for example, to power lines for a forward drive, and similarly when the switch arm 63a is moved out of the neutral or off position into engagement with the other pair of contacts 97 the direction of turn of the motor can be reversed.

Now, normally the electrical switch arm 63 is in the neutral upright position, shown in FIG. 6, which is the off position. By turning the knob 34, the graduated dial knob 40 can be turned to the desired length of thread to be cut. In this respect, referring to FIGS. 8 and 9, the closer the leg 50 is moved toward the squared portion 59 of trip element 58 the further the leg will have to travel before it contacts the flange 74 on pivoted lever 72 for moving the lever 72 and its locking lug 73 out of cooperation with the switch actuating lever 78 (FIG. 5). It follows that the further this leg 50 travels before engaging flanged latching lever 72, the longer will be the thread that is cut on the work piece. Conversely, the shorter the distance, the quicker the lever 72 will be tripped by contact with its flange 74 for raising the latching lever 72.

The lengthwise adjustment of the squared portion 47 (FIG. 8) on the end of the rod 30 is permitted since it can telescope the central bore or hole in the knob 34. Also, this telescoping operation permits the rod 30 to move bodily into and out of knob 34 in the threading and unthreading operations since its squared portion 47 can move in and out of the knob.

After the knob 34 has been turned to adjust for the proper length of thread cut, the motor can be set into operation by manually pressing the handle portion 70 on the slidable blade 68 (FIGS. 6 and 7) to move the switch arm 63 to the left (FIG. 6) into the on position for the motor, thus starting the cutting operation. In this position, spring 76 forces lever 72 downwardly to bring its lug 73 into latching engagement with the forward edge of tripping lever 78. Also, in the on position cup 87 is in gripping engagement with the plate 90 through the pivoting of lever 81 integral with switch tripping arm 78. As the cutting operation progresses, the rod 30 moves toward the knob 34 (FIG. 8) and further into telescoping relation therewith moving the leg 50 until it trips the spring urged latching lever 72, as previously noted, causing it to move upwardly.

Upon the upward tripping of the lever 72, the switch tripping arm 78, under the force of spring 57, moves the switch arm 63 to the neutral upright or off position shown in FIG. 6 to turn off the motor.

In this respect it will be noted that, as leg 50 of U-shaped arm 49 is moved toward knob 34 in the threading of the pipe, the spring 57 is stretched and put under tension. If a ¾" thread is being cut, the leg 50 travels a distance corresponding to the length of that thread. On the other hand, if a ½" thread is being cut, the initial adjustment of the leg 50 closer to the knob will place the spring under an amount of tension corresponding to the difference between ¾" and ½". This means that spring 57 is always placed under the same amount of tension by threading operation regardless of the length of thread being cut. This built-up tension is sufficient to snap the electric switch arm 63 from on position through the intermediate or off position into the reverse position.

However, while the switch arm 63 is in the on position, the suction cup 87 is in gripping engagement with plate 30; and this engagement is sufficient to preclude immediate snapping of the switch arm 63 past the intermediate off position to the reverse position. In this way, a time delay is effected, since the pull of the spring 57 is delayed in snapping the switch arm 63 to reverse position until the spring can pull the cup 87 out of its frictional grip with plate 90.

The snapping of arm 63 to motor reversing position then results in the rod 30 being moved in the opposite direction during the unthreading operation and away from knob 34 back to its original position at the start of the threading.

When the unthreading operation is completed, the lug 62 (FIG. 9) on tripping arm 58 on rod 30 engages the electrical switch arm 63 to move it into neutral or off position restoring the parts to the position they were in FIG. 6, in which position the lever 72 is elevated against the force of stretching spring 76.

Thereafter, the operation can be repeated by manually pushing in on the portion 70 of the blade 68 to move the switch arm 63 to on position and to restore the interlocking engagement of the two levers 72 and 78.

Although minor modifications might be suggested by those versed in the art, it should be understood that I wish to embody within the scope of the patent warranted thereon, all such embodiments as reasonably and properly come within the scope of my contribution to the art.

I claim as my invention:

1. In an automatic reversible electrical motor tool including a work piece receiving casing the improvement comprising:

switch means for actuating said motor for both forward and reverse turning and with an intermediate position, work performing mechanism actuated by said motor to perform predetermined operations on the work piece and including movable means carried by the casing responsive to the direction of movement of the mechanism for actuating said switch means to both forward, reverse and off positions, and a tripping device responsive to said movable means and mechanically interrelated with said switch means for holding same temporarily in an intermediate off position between forward and reverse positions and for a period of time sufficient for the motor to stop turning while the work performing mechanism is in engagement with the work piece before the direction of turn of the motor is reversed by the switch means.

2. The tool of claim 1 further characterized by said switch means when moved to an off position being positively held in an intermediate position and by the inclusion of a manually operable device for releasing and moving the switch means to a forward turning on position.

3. The tool of claim 1 further characterized by said tripping device including suction cup means movable into a gripping position when the switch means is moved to forward turning position and the release of which is time delayed after movement of the switch means out of the forward turning position to shut off the motor temporarily before going into reverse turning position.

4. The tool of claim 1 further characterized by said tripping device including releasable gripping means movable into gripping position when the switch means is moved to forward turning position and the release of which is time delayed after movement of the switch means out of the forward turning position to shut off the motor temporarily before going into reverse turning position, and said switch means after completion of the reverse turning operation of the motor being automatically moved to an off position.

5. The tool of claim 1 further characterized by said tripping device including a plunger-like element with a suction cup movable into a gripping position when the switch means is moved to forward turning position and the release of which is time delayed after movement of the switch means out of the forward turning position to shut off the motor temporarily before going into reverse turning position.

6. The tool of claim 1 further characterized by said tripping device including suction cup means movable into gripping position when the switch means is moved to forward turning position and the release of which is time delayed after movement of the switch means out of the forward turning position to shut off the motor temporarily before going into reverse turning position, and said switch means after completion of the reverse turning operation of the motor being automatically moved back to an intermediate off position.

7. The tool of claim 1 further characterized by said tripping device including a releasable gripping means movable into a gripping position when the switch means is moved to forward turning position and the release of which is time delayed after movement of the switch means out of the forward turning position to shut off the motor temporarily before going into reverse turning position, said switch means after completion of the reverse turning operation of the motor being automatically moved to an off position, and being only movable by manual actuation to an on forward turning position.

8. The tool of claim 1 further characterized by said movable means including graduated adjusting mechanism for varying the extent of the work performed before actuation of said switch means from its forward drive position toward the off position.

9. The tool of claim 1 further characterized by said tripping device including a suction cup movable into a gripping position when the switch means is moved to forward turning position and the release of which is time delayed after movement of the switch means out of the forward turning position to shut off the motor temporarily before going into reverse turning position, said switch means after completion of the reverse operation of the motor being automatically moved back into an intermediate off position, and being only movable by manual actuation to a forward turning on position.

10. In an automatic electric tool including a work piece receiving casing:
   switch means for actuating said motor for both forward and reverse turning and with an intermediate off position,
   work performing mechanism actuated by said motor to perform predetermined operations on the work piece and including movable means carried by the casing responsive to the direction of movement of the mechanism for actuating said switch means to both forward, reverse and off positions, and
   a movable device mechanically responsive to movement of said movable means and operatively interrelated with said switch means for holding same temporarily in an intermediate off position between forward and reverse positions and for a period of time sufficient for the motor to stop turning under friction of engagement of the work performing mechanism with the work piece before the direction of turn of the motor is reversed by the switch means.

11. The tool of claim 10 further characterized by said switch means when moved to an off position including means positively holding the switch means in an intermediate position and by the inclusion of a separately operable device for releasing and moving the switch means to a forward turning on position.

12. In an automatic electric motor driven work piece including a reversible electric motor, a work piece holding vise and a threading die on a carriage driven by said motor for cutting a thread on said work piece the improvement comprising:
   switch means for actuating the motor having a forward drive position, a neutral off position and a reverse drive position,
   trip mechanism mechanically responsive to and controlled by relative movement of said die carriage and work pieces for actuating said switch means from the forward drive position through said neutral position to the reverse position upon the completion of a predetermined thread cutting operation and for moving the switch means from said reverse position to said neutral off position upon unthreading of the threading die from the work piece, and
   a switch movement time delay mechanism also responsive to said relative movement for holding the switch means temporarily at the neutral off position for a period of time sufficient for the motor to stop turning while the die is engaged with the work piece and before the motor is reversed by the switch means.

13. The improvement of claim 12 further characterized by graduate means for adjusting the trip mechanism to control the length of the threads cut on the work piece.

14. The improvement of claim 12 further characterized by said switch having means for automatically moving the switch means to the neutral off position after unthreading of the die from the work piece.

15. The improvement of claim 12 further characterized by said switch having means for automatically moving the switch means to the neutral off position after unthreading of the die from the work piece, and by said switch means also having manually operable means for moving it from the neutral position to the forward drive position.

16. The improvement of claim 12 further characterized by said time delay mechanism including a suction cup operable by said trip mechanism for applying a gripping pressure during the on and neutral off positions of the switch means and automatically releasable for said switch means to move automatically to the reverse drive position.

17. The improvement of claim 12 further characterized by said trip mechanism including adjustable mechanism having visual indicia graduated in terms of length of thread cut for varying the extent of travel of the trip mechanism in accordance with the length of thread desired.

18. The improvement of claim 12 further characterized by said trip mechanism including adjustable mechanism having visual indicia graduated in terms of length of thread cut for varying the extent of travel of the trip mechanism in accordance with the length of thread desired, said adjustable mechanism including a micrometer-like telescoping rod structure including a manually adjustable screw connection for varying the length of the rod structure in controlling the travel of the trip mechanism.

19. The tool of claim 1 further characterized by said tripping device including a plunger-like element with a suction cup movable into a gripping position when the switch means is moved to forward turning position and the release of which is time delayed after movement of the switch means out of the forward turning position to shut off the motor temporarily before going into reverse turning position, and means for varying the gripping engagement of the suction cup to adjust its time of release.

20. The improvement of claim 12 further characterized by said time delay mechanism including a suction cup operable by said trip mechanism for applying a gripping pressure during the on and neutral off positions of the switch means and automatically releasable for said switch means to move automatically to the reverse drive position, and means for adjusting the gripping pressure applied by said suction cup.

References Cited

UNITED STATES PATENTS

| | | | |
|---|---|---|---|
| 1,837,054 | 12/1931 | Lyon | 10—136 |
| 1,991,927 | 2/1935 | Herrmann et al. | 10—136 |
| 2,318,336 | 5/1943 | Schauer | 10—136 |
| 2,551,936 | 5/1951 | Funk | 10—136 |
| 2,584,456 | 2/1952 | Humphreys | 10—136 |
| 2,600,779 | 6/1952 | Knosp et al. | 10—136 |
| 2,696,580 | 12/1954 | Shewmon et al. | 318—285 |
| 2,732,521 | 1/1956 | Carpenter et al. | 318—285 |
| 2,810,141 | 10/1957 | Langston | 10—89 |
| 3,295,038 | 12/1966 | Trottman | 318—285 |
| 3,365,735 | 1/1968 | Brown | 10—136 |

CHARLES W. LANHAM, *Primary Examiner.*

E. M. COMBS, *Assistant Examiner.*

U.S. Cl. X.R.

10—136